United States Patent [19]
Grebnev et al.

[11] Patent Number: 5,796,366
[45] Date of Patent: Aug. 18, 1998

[54] METHOD OF AND APPARATUS FOR POSITION LOCATION AND TRACKING OF A VEHICLE OR THE LIKE BY THE RECEPTION AT THE VEHICLE OF PULSED RADIO NAVIGATION SIGNALS AS OF THE LORAN-OC TYPE AND THE LIKE, WITH AN AUTONOMOUS LOOP ANTENNA-RECEIVER

[75] Inventors: Andre V. Grebnev, Bedford, Mass.; Jan H. Anderson, Newport Beach, Calif.

[73] Assignee: Megapulse, Incorporated

[21] Appl. No.: 695,361

[22] Filed: Aug. 9, 1996

[51] Int. Cl.⁶ ................................................. G01S 5/04
[52] U.S. Cl. ........................ 342/448; 342/432; 342/389
[58] Field of Search ................................. 342/448, 389, 342/432, 428, 429, 437, 439

[56] References Cited

U.S. PATENT DOCUMENTS 4,054,881 10/1977 Raab .
4,489,327 12/1984 Eastwell ............................ 342/432

Primary Examiner—Theodore M. Blum
Attorney, Agent, or Firm—Rines and Rines

[57] ABSTRACT

This disclosure deals with processing radio-frequency navigation signals, particularly Loran-C signals, from crossed loop antennas (H-field antennas) by shifting the signal phase from two loops to be in quadrature with respect to each other and adding them together to achieve omnidirectivity of the antenna pattern during the acquisition mode; using the stronger signal of the two during the cycle selection mode to determine the polarity of the received signals; and calculating the relative bearing angles on transmitting stations to determine, with measured bearing, the orientation of the loop antenna with respect to these stations.

14 Claims, 3 Drawing Sheets

| HARD-LIMITED RF |  |
| HARD-LIMITED DERIVED (POSITIVE LOBE) |  |
| HARD-LIMITED DERIVED (NEGATIVE LOBE) |  |

METHOD OF AND APPARATUS FOR POSITION LOCATION AND TRACKING OF A VEHICLE OR THE LIKE BY THE RECEPTION AT THE VEHICLE OF PULSED RADIO NAVIGATION SIGNALS AS OF THE LORAN-OC TYPE AND THE LIKE, WITH AN AUTONOMOUS LOOP ANTENNA-RECEIVER

The present invention relates to the position location and tracking of vehicles or the like by reception of pulsed radio navigation signals as of the Loran-C type and the like, being more particularly directed to such location with the aid of loop antenna receivers at the vehicle.

BACKGROUND OF INVENTION

Location and navigation by vehicles on the sea, on the ground and in the air, through reception of Loran-C navigational pulsed radio signals from three master-slave timing-controlled transmitting stations located in different directions from the receiver, wherein positional information is derived from the reception and determination of the time of reception of the pulsed radio frequency signals of carrier coherent with the pulse envelope and in which the carrier phase provides fine resolution of the timing measurement, have been successfully used world-wide for many decades.

Very suitable transmitters are of the solid-state type such as those manufactured by the assignee of the present invention described, for example, in U.S. Pat. Nos. 3,711,725, 3,889,263, 4,001,598, 4,151,528 and 4,423,419, and receivers may be of the types, for example, described in U.S. Pat. Nos. 3,736,590, 3,774,210, 3,921,076, 4,392,138 and 4,482,896.

The vehicles, depending upon their nature and usage, have employed various types of antennas for receiving the navigational signals, including, among others, linear, whip and loop antennas connected to the vehicle Loran-C receiver.

More recent applications of positional tracking have centered about vehicles traveling through regions of high electrostatic noise and/or copious shielding and reflection structures as of metal, such as are found within cities or other areas, giving rise to the frequent loss of adequate tracking signal strength and the requiring of frequent re-acquisition of signals after such losses.

The use of loop antennas for reception in such areas has been considered desirable from the standpoint of enabling reception in regions of high electrostatic noise and shielding by metal structures, but the loop antenna characteristics which result in directional nulls and phase inversions have heretofore prevented reasonable implementations. Military applications of loop antennas for the reception of Loran-C signals (a specific application this disclosure addresses), have accordingly required the use of an additional very high-cost inertial navigation system to resolve the issues of orientation for maximum signals and phase inversions. The technique disclosed by the present invention, however, now permits loop/receiver autonomous resolution of these issues.

OBJECTS OF THE INVENTION

An object of the present invention, accordingly, is to provide a new and improved method of and apparatus for using loop antenna-Loran C receivers on vehicles, that overcome the before-described plaguing signal losses in regions of high electrostatic noise and/or shielding metal or other structures, and do not require supplemental systems for resolving signal orientation or phase inversion resolution, but provide for autonomous reception.

A further object is to provide a novel and improved loop antenna-receiver system of more general applicability, also.

Other and further objects will be explained hereinafter and are more fully delineated in the appended claims.

SUMMARY

In summary, particularly in its application to Loran-C navigation signal reception, the invention embraces a method of vehicle location by a pair of orthogonally crossed loop antennas for receiving radio-frequency navigation signals from navigation transmitters, that comprises, acquiring the signals in the individual loop antennas of the pair of loop antennas; along separate channels, separately phase-shifting the acquired signals respectively + and −45° and then adding together the signals acquired by the individual loop antennas of the pair to render the loop antenna pattern omnidirectional; selecting the stronger of the transmitted channel signals and using its polarity as the received signal reference; determining from signal time delays a rough estimate of relative bearing angles to the transmitter; and using said relative bearing angles together with measured bearing angle to determine the orientation of the loop antenna with respect to the transmitters.

Preferred and best mode designs and techniques are hereinafter described in detail.

DRAWINGS

The invention will now be explained in connection with the accompanying drawings, FIG. 1 of which is a polar antenna reception diagram showing the positive and negative lobes of crossed loop antennas, illustrating problems underlying their use;

FIG. 2 presents waveforms of pulses received in the positive and negative lobes;

PREFERRED EMBODIMENT(S) OF THE INVENTION

As before explained, a Loran-C receiver receives pulsed RF, phase-coherent signals from at least three transmitting stations which are in different directions from the receiver. The time difference between the signals provides position information. To achieve the maximum accuracy, the carriers of the signals are used to provide very fine resolution of the signal timing.

Where loop antennas are desired, the receiver must use two receiving loop antennas, such as, for example, wound-wire loops, so constructed as to have their azimuths of maximum reception orthogonally crossed at 90° to each other.

In accordance with the operation under the technique of the invention, the autonomous receiver goes through several steps ultimately to synchronize and track the signals:

1. Initial Search and Acquisition—First, the receiver must locate the signals in time, without knowledge of direction or polarity of the signals, and without precise setting of the frequency of the receiver. Since the receiver cannot determine which loop to use, this invention provides for combining the signals to provide an omnidirectional pattern.

2. Receiver Synchronization—In order precisely to set the receiver tuning, the first signal synchronized is used precisely to tune the receiver. This is necessary to allow weaker signals to be integrated over time so that all signals may be synchronized. The invention provides for the selection of the appropriate loop antenna for such receiver synchronization.

3. Azimuth Estimation—Next, the receiver estimates an approximate position determined from the initial synchronization, and determines the relative azimuths or bearings of all transmitting stations. From the strongest station, the relative amplitudes of signals from each loop and the envelope derivative polarity are used to measure that station azimuth with respect to the antenna reference direction. The approximate position and reference direction are enough information finally to determine which loop and signal polarity are appropriate for all signals being tracked.

Figure 1:
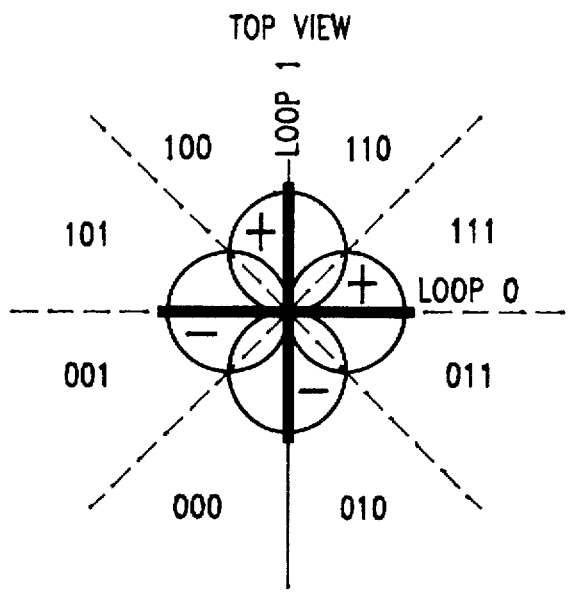

Turning, first, to the reception characteristics of loop antennas (so-called H-field antennas), the loop antenna has a bi-directional pattern looking like a figure "8", one of the pattern lobes being "positive", and the other, "negative". Signals received in the positive lobe will have the same phase on the output of loop antenna winding, and signals received in the negative lobe will be inverted. When used in a Loran-C application, this, in turn, will result in 5 microsecond errors in the Loran-C receiver. In order to achieve an omni-directional pattern, with the use of a pair of loop antennas, shown in FIG. 1, oriented or crossed 90 degrees with respect to each other, this problem is even further aggravated.

In the past, in cases when high accuracy was not needed, 5 microsecond errors were tolerated; and when accurate positioning was necessary, the loop antenna receivers, as before stated, were fed with additional navigational information from another source (INS, for example) to determine bearings on transmitting stations and to figure out in which lobe the antenna signals of each station are being received. This limitation, however, made the loop antenna receivers dependent upon another navigation system, significantly limiting their capabilities.

As previously pointed out, an object of the present invention is to provide a new method of determining the polarity of the Loran-C signals, as in hard-limited Loran-C receivers, without such an additional source of information.

Figure 2:
Figure 2:
Figure 2:
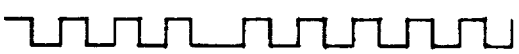

It is practically impossible, however, to determine the initial phase of such hard-limited RF Loran-C signals due to the fact that the beginning of the pulse is contaminated by noise and interfering signals. The information of the signal polarity, however, can be obtained from hard-limited derived signals. The derived signal is obtained by delaying the RF signal 5 microseconds and adding it to the non-delayed signal. As a result of this operation, a phase reversal occurs somewhere on Loran-C signal. By changing the amplitudes of delayed and not-delayed signals, this phase reversal can be placed at any desired part of the Loran pulse as shown in FIG. 2.

In standard Loran-C receivers, derived signals have heretofore only been used to determine the point of the pulse at which it will be tracked by the receiver. In the loop antenna-receiver of the present invention, on the other hand, the derived signals are used to determine not only the tracking point, but to determine the phase of the incoming signal, as well; i.e. to determine whether it was received through a positive lobe or a negative lobe.

Figure 3:
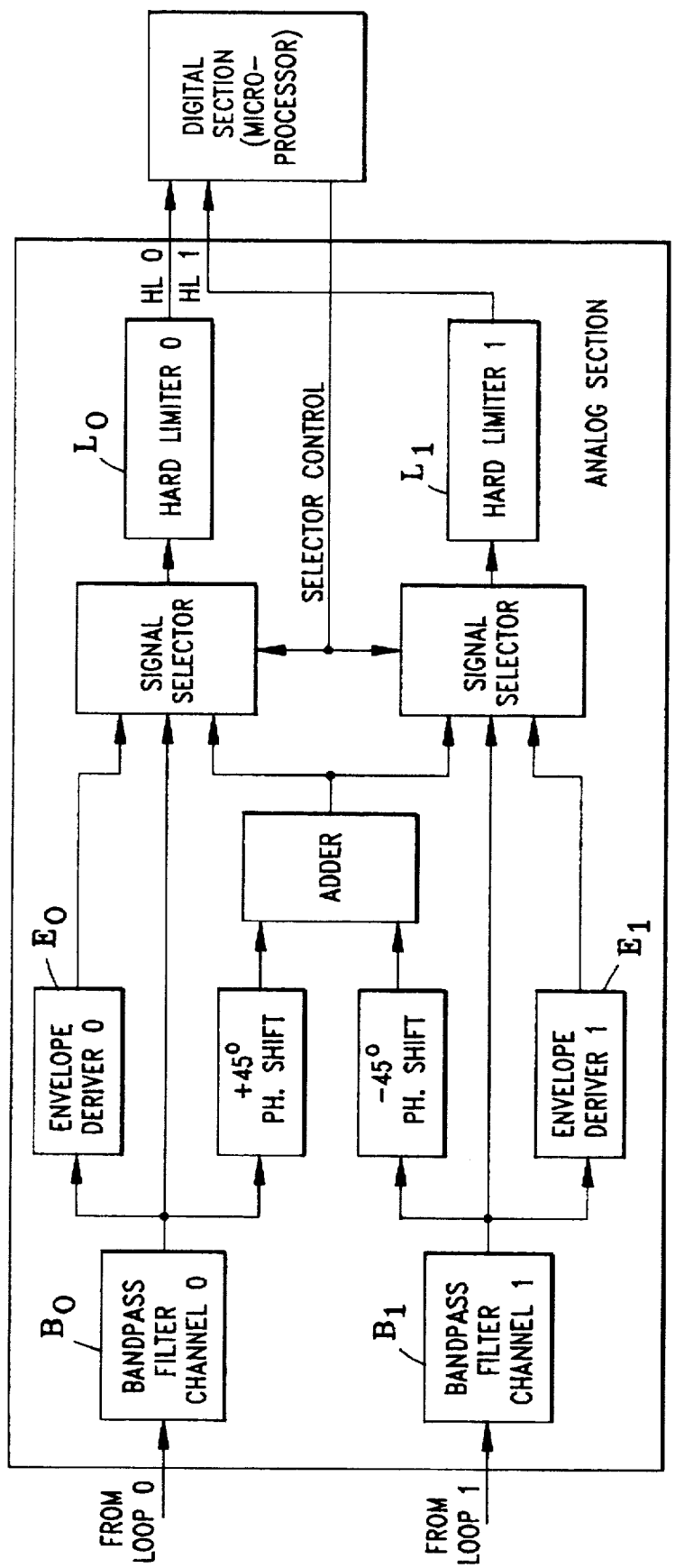
FIG. 3 is a block circuit diagram of the preferred receiver for use with crossed loop antennas in accordance with the invention.

The structural scheme of the receiver is similar to an ordinary Loran-C receiver but with a very important difference that the signals from each loop are processed in separate channels. The block diagram of this novel crossed loop-receiver is shown on FIG. 3, consisting of two identical RF channels from "Loop 0" and "Loop 1", each consisting of a bandpass filter $B_0$, $B_1$, an envelope deriver $E_0$, $E_1$, and a hard limiter, so labeled at $L_0$ and $L_1$. An additional scheme is also added to the receiver which shifts the phase of signal received by loop "1", $-45°$, shifts the phase of the signal received by loop "0" $+45°$, and adds the quadrature-shifted signals together in the "Adder". This operation makes the pattern of crossed-loop antenna omnidirectional, and the added signal is used during the acquisition mode, as later explained.

As in any Loran-C receiver, loop antenna-receiver operation consists of the three modes earlier discussed:

acquisition;
cycle selection;
tracking or RF mode.

In the acquisition mode, signals from both loops are shifted and added together, which makes a signal amplitude almost independent of bearing angles to received stations. The phase of the signal, however, is dependent on the angle, which may explain why, before the present invention, shifted-and-added signals were not used for tracking, but only for initial acquisition on master and secondary stations and front edge location. In this mode, data in both hard limited channels is identical and the receiver uses only one of them.

In the deriver mode, two channels of the hard-limited data carry information about the polarity of the received signals. Both data streams are fed to the digital board section (microprocessor) and the receiver selects the stronger channel of the two during its tracking mode for providing a signal polarity reference; and, in the deriver mode, samples only that channel to perform cycle selection.

In the RF mode, the two channels contain data of the hardlimited RF Loran signals. This mode is used for clock synchronization, tracking during cycle selection, and final tracking after the completion of cycle selection.

While preferring hard limiting, linear and other receivers may also be used. There is a design choice to be made between the two: hard limited is simpler to design and lower cost to manufacture. The required software is probably not significantly different between the two except that linear processing allows implementation of software notch filters, and the linear receiver should be expected to operate at lower signal to noise ratios. Accuracy on +0 db SNR and greater signals will, however, be the same for a given clock implementation. As operation is pushed to lower SNR's, the linear receiver, indeed, may provide better accuracy, and will track with less overshoot.

In the tracking mode, hardlimited signals of both channels are continuously correlated with known pattern, and the channel with higher correlation value is selected for tracking, as later more fully explained. In order to perform this function properly, the loop antenna pattern, in accordance with the invention, was conditionally divided into 8 sectors as in FIG. 1. The three digit numbers in FIG. 1 correspond to:

first digit: polarity of loop 0 second digit: polarity of loop 1
third digit: the loop with the strongest signal.

This three-digit word identifies the sector of the loop antenna pattern through which the signal is received.

Figure 4:
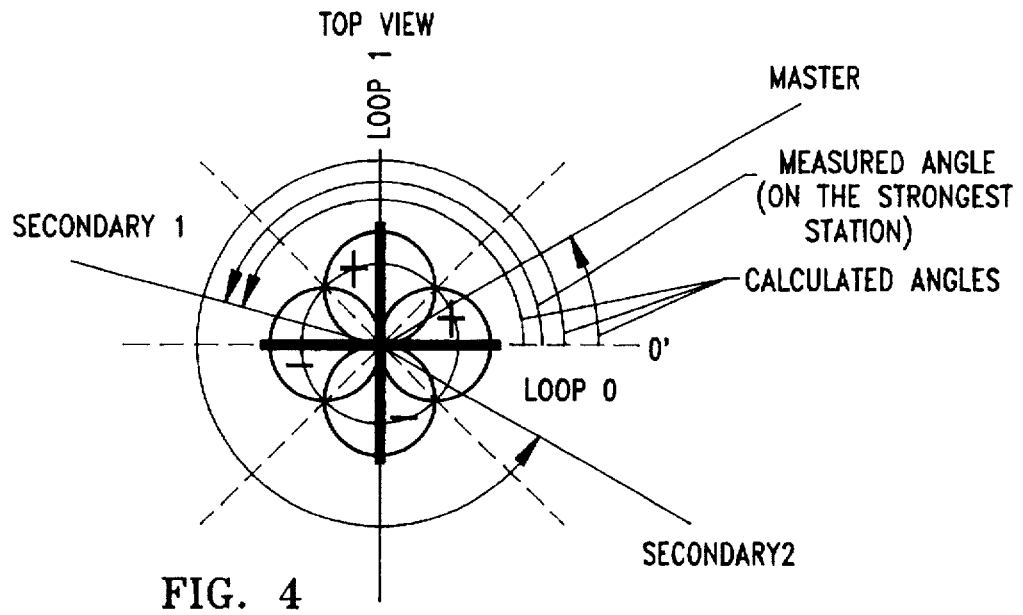
FIG. 4 is a combined polar plot and signal acquisition diagram explanatory of the workings of the invention.

In order to provide reliable cycle selection on remote stations with low SNR values (<0 db), however, the following routine is implemented in the receiver, as indicated in FIG. 4.

1). In the cycle selection mode, the receiver measures rough time delays and converts them, as is well known, into Latitude/Longitude locations, i.e. determines its own position with <50 km accuracy.
2) This position information is then used to determine, as is well known, relative bearing angles to Loran-C stations ("calculated angles" on FIG. 4), the coordinates of which are known.
3). After cycle selection on the strongest station in the chain (with SNR<0) is completed, a rough bearing angle to that station ("measured angle" on FIG. 4) can be calculated by comparison of the correlation values of each channel.
4. This absolute bearing angle together with the relative bearing angles gives less than 90 degrees estimate to determine in which lobe of the loop antenna pattern, positive or negative, the Loran signals are being received. Thus, the receiver will be searching only for one polarity of the derived signal, positive or negative.

In order to determine the "reference point", or relative 0-bearing angle, the receiver conditionally defines it at the maximum of the positive lobe of loop 1 and at the null of the loop 0 pattern as shown in FIG. 4.

Further details of the before-discussed correlation technique for selecting the stronger channel for continued-receiver tracking are in order. As previously noted, the receiver is to track the best to "time" (meaning determine and adjust), depending on design of either the master station or the largest signal-to-noise ratio. The receiver clock frequency permits continuous tracking through the cross-correlation process of repetitively taking the instantaneous product of the received signal and a sampling waveform generated by the receiver clock. The instantaneous products are summed, smoothed and used as a measure of the synchronization error between the received signals and the receiver clock In tracking, this error signal is used to adjust the sampling waveform to provide exact synchronization of the receiver clock with the received signals.

The initial cross-correlation step is to determine the receiver oscillator error, which is generally much larger than the Doppler shifts encountered in the received signals as the vehicle moves toward one station and away from another, even at jet air craft speeds. Once the oscillator error is reduced to the range of Doppler shifts, it is then possible to use longer time constants in smoothing the cross-correlation process. This, in turn, allows operation at lower signal-to-noise ratios, so the receiver can search for the less-than-best signals.

The signal from the station with the highest signal-to-noise ratio is chosen, as before explained, to determine the loop antenna orientation. First, the phase shift network is switched out and the signals from each loop are separately tracked by the receiver which then determines the orientation with 180° (5 μsec) ambiguity, from the ratio of the signal-to-noise ratios from the two channels. The 5 μsec ambiguity results from the inverting characteristic of the two lobes of the loop antenna receiving pattern. The 180° (5 μsec) ambiguity is then resolved by using the envelope-to-cycle difference (ECD). The envelope-to-cycle difference is normally used to resolve 10 μsec ambiguity in all receivers. By developing a special resolution means to measure the ECD, the 5 μsec ambiguity is resolved. From this information, the geographic alignment of the loop antenna and the azimuth of the best signal are thus determined.

Next, the 10 μsec ambiguity is resolved on all signals using the ECD as is normally done. Although there is still a 5 μsec ambiguity, an approximate geographic position is computed, which results in knowledge of the relative azimuths of all stations being tracked. Since the geographic alignment of the loop antenna and the azimuth of one of the signals is known, the azimuth of the remaining signals is known and the 5 μsec ambiguity of these signals is resolved from knowledge of their orientation to the lobes of the loop.

The receiver is now considered to be in the tracking mode of operation with full accuracy available. The receiver, however, will continue to compute the loop orientation as the vehicle moves and turns. As turns occur and as station azimuths change, the receiver selects the preferred loop antenna and polarity to assure precision signal tracking.

Figure 5:
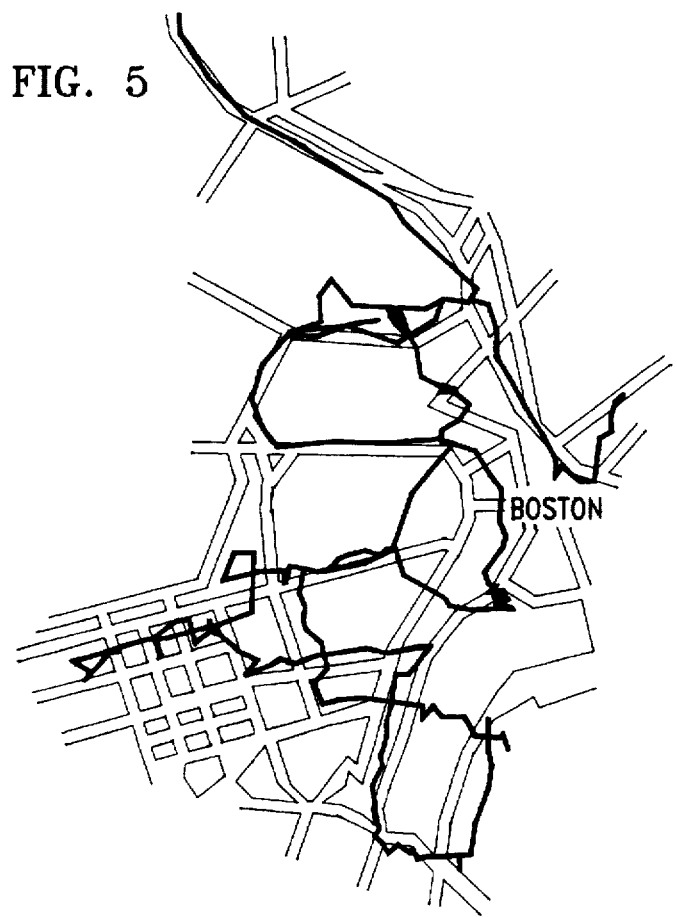
FIG. 5 is an actual tracking chart of a vehicle equipped with the present invention, through part of Boston, Mass.

Through this novel approach, the ability of the loop-receiver of the invention to maintain tracking even in crowded cities and the like with metal structures, and in high electrostatic noise regions, has proved to be outstanding. FIG. 5 is a reproduction of a tracking plot attained in the Boston area with the loop-receiver of the invention showing superior tracking continuity.

While described in connection with the preferred Loran-C operation, the techniques of the invention are also useful with other pulsed navigation and related systems; and other H-type antennas than the wound loops illustrated (all generically called "loop antennas" herein) may also be similarly used; and further modifications will occur also to those skilled in the art, all such being considered to fall within the spirit and scope of the invention as defined in the appended claims.

What is claimed is:

1. A method of vehicle location by a pair of orthogonally crossed loop antennas for receiving radio-frequency navigation signals from navigation transmitters, that comprises, acquiring the signals in the individual loop antennas of the pair of loop antennas; along separate channels, separately phase-shifting the acquired signals respectively + and −45° and then adding together the signals acquired by the individual loop antennas of the pair to render the loop antenna pattern omnidirectional; selecting the stronger of the transmitted channel signals and using its polarity as the received signal reference; determining from signal time delays a rough estimate of relative bearing angles to the transmitters; and using said relative bearing angles together with measured bearing angle to determine the orientation of the loop antenna with respect to the transmitter.

2. A method as claimed in claim 1 and in which the navigation signals are Loran-C type signals from master and secondary station transmitters.

3. A method as claimed in claim 2 and in which, following the acquisition of the transmitted signals by the loop antennas and their reception along the separate channels and the selecting of the stronger channel signal, the signal on the selected channel only is sampled to perform cycle selection in that radio-frequency signal; and correlating the data contained in the radio frequency signals with a predetermined known pattern to select for tracking that channel signal with the higher correlation value.

4. A method as claimed in claim 3 and in which, in the cycle selection, time delays are measured and converted into position location information from which relative bearing angles to the Loran-C stations are calculated.

5. A method as claimed in claim 4 and in which, after cycle selection on the strongest signal from a station transmitter, a rough bearing angle to that station is calculated by comparison of the correlation values of each channel with the bearing angle and relative bearing angles, enabling determination of in which lobe of the loop antenna pattern, positive or negative, the Loran-C signals are being received, such that the receiver searches only for one polarity of the derived signal.

6. Apparatus for radio navigation signal vehicle location having, in combination, a pair of orthogonally crossed loop antennas for receiving radio-frequency navigation signals from navigation transmitters; a corresponding pair of radio-frequency receiver channels, one for each of the pair of loop antennas; + and −45° phase-shifters respectively inserted into the channels and connected to an adder to combine the phase-shifted signals, thereby to render the loop antenna pattern omnidirectional.

7. Apparatus as claimed in claim 6 and in which the radio frequency signals in each channel are passed through respective hardlimiters and then to a microprocessor for digitally comparing them to select the stronger channel signal.

8. Apparatus as claimed in claim 7 and in which means is provided for continuously correlating the hardlimited signals of both channels with a predetermined pattern and for selecting for tracking the channel signal with the higher correlation value.

9. Apparatus as claimed in claim 6 and in which the reception pattern of the loop antenna is divided into 8 sectors, assigning a first digit for the polarity of one loop antenna pattern; a second digit for the opposite polarity of the other loop antenna pattern, and a third digit for the loop receiving the strongest signal, the resulting three-digit word identifying the sector of the loop antenna pattern through which the signals are received.

10. Apparatus as claimed in claim 9 and in which the navigation signals emanate from Loran-C master and secondary station transmitters and in which, in selecting the desired cycle of the Loran-C received signal for acquisition, means is provided for the receiver to measure rough time delays and correct them into positional location information.

11. Apparatus as claimed in claim 10 and in which means is provided for determining from said information the relative bearing angles to the Loran-C stations.

12. Apparatus as claimed in claim 11 and in which, after cycle selection on the strongest station signal is completed, means is provided for thereupon calculating a bearing angle to that station using said correlation values of each channel; the bearing angle together with said relative bearing angles determining which lobe of the loop antenna pattern, positive or negative, the Loran-C signals are being received, the receiver then searching only for one polarity of the derived signal.

13. Apparatus as claimed in claim 6 and in which the navigation signals emanate from Loran-C master and slave station transmitters and in which each channel receiver is provided with a bandpass filter connected to a corresponding phase shifter and to a Loran-C signal envelope deriver in turn connected to a channel signal selector also inputted from the corresponding bandpass filter and an adder connected to the phase shifter of each channel; each channel signal selector being connected to a hard limiter and thence to a microprocessor for performing digital analyses on the signals, including correlations to determine the stronger channel signal and to provide selection control of the signal selectors.

14. In apparatus for receiving radio-frequency navigational signals emanating from Loran-C master and slave station transmitters, and acquired by a pair of crossed loop antennas, a receiver system having, in combination, a pair of radio-frequency receiving receiver channels to be respectively connected to the pair of antennas, each channel receiver provided with a bandpass filter connected to a corresponding phase shifter and to a Loran-C signal envelope deriver in turn connected to a channel signal selector also inputted from the corresponding bandpass filter and an adder connected to the phase shifter of each channel; each channel signal selector being connected to a hard limiter and thence to a microprocessor for performing digital analyses on the signals, including correlations to determine the stronger channel signal and to provide selection control of the signal selectors.

* * * * *